United States Patent

Wu

[11] Patent Number: 5,979,873
[45] Date of Patent: Nov. 9, 1999

[54] METHOD OF MAKING BALL VALVES

[76] Inventor: Lei-Jui Wu, No. 13, Fang Yuan Hsiang, Hou Liao Tsun, Kung Chu 4 Road, Chang Hua Hsien, Taiwan

[21] Appl. No.: 09/192,290

[22] Filed: Nov. 16, 1998

[51] Int. Cl.$^6$ ....................................................... F16K 5/06
[52] U.S. Cl. .............................. 251/315.16; 29/890.132
[58] Field of Search ................ 251/315.16; 29/890.132, 29/899.1

[56] References Cited

U.S. PATENT DOCUMENTS

| | | | |
|---|---|---|---|
| 2,963,772 | 12/1960 | Niles, Jr. ............................ | 29/899.1 X |
| 3,518,742 | 7/1970 | Merrill et al. ................. | 251/315.16 X |
| 5,659,956 | 8/1997 | Graginsby et al. ................ | 29/899.1 X |

*Primary Examiner*—John Fox
*Attorney, Agent, or Firm*—Bacon & Thomas

[57] ABSTRACT

A method of making ball valves, including the steps of forging two symmetrical ball valve halves into shape such that they each have a spherically curved outer wall and a cylindrical inner wall joined at one end to the outer wall and otherwise separated by a channel; bringing the ball valve halves together to form a spherical ball valve; friction welding the ball valve halves as a whole so that reinforcing ribs are formed on the welding surfaces due to fusion and a straight flow path is defined in the ball valve; using a punch with a ram having a diameter corresponding to that of the straight flow path of the ball valve to remove the reinforcing rib on the inner wall of the straight flow path so that the wall surface of the straight flow path is smooth; and processing the surface of the ball valve. A weight-reduced hollow ball valve having a straight flow channel in the center thereof is therefore accomplished to allow smooth flow of water therethrough, and reduction in the weight of the ball valve borne by water stopping washers on both sides of the ball valve to thereby prolong the service life of the water stopping washers.

1 Claim, 4 Drawing Sheets

5,979,873

METHOD OF MAKING BALL VALVES

BACKGROUND OF THE INVENTION (a) Field of the Invention

The present invention relates generally to a method of making ball valves, and more particularly to a method in which two symmetrical ball valve halves are forged into shape and are welded together using friction welding such that a hollow spherical ball valve with a straight flow channel in the center is accomplished. Ribs formed on the welding surfaces at the straight flow path are removed by punching to achieve smooth surfaces. The surface of the ball valve is finally processed to achieve a weight-reduced ball valve. In use, the load borne by the water stopping washers on both sides of the ball valve can be reduced to prolong the service life of the water stopping washers. Besides, the straight flow channel allows smooth flow of water therethrough; the ball valve has good structural strength; and manufacturing costs can be lowered.

(b) Description of the Prior Art

The ball valve referred to herein is, as shown in FIG. 1, a ball valve structure that rests against water stopping washers 51 of a water valve and rotates to control the opening and closing of a water faucet. Referring to FIG. 2, in the past, ball valves were made by casting. Cast iron is poured in a mold, and a ball-shaped semi-finished product is removed from the mold after drying. The surface thereof is then processed and burred to accomplish a ball valve product.

However, there are many disadvantages with a ball valve made in the above-described method.

1. As the conventional ball valve is formed by casting, there are air bubbles inside during casting. During formation, in order to reduce the number of pores formed on the surface of the ball valve, the thickness of the ball valve is increased deliberately. After formation, the surface layer is processed using a lathe. It can be seen that proportion of waste material is high, yet there are still pores on the surface of the ball valve. As a result, the surface of the ball valve is not in tight fit with the water stopping washers on both sides of the water hole of the faucet, and water leaks through the pores of the ball valve. It can therefore be seen that it is impossible to form a ball vale free of pores using such a casting method.

2. Furthermore, the conventional ball valve has a substantially spherical hollow interior (as shown in FIG. 2). When water from the water hole of the faucet flows through the hollow interior of the ball valve, it will hit against the walls of the substantially spherical hollow interior of the ball valve so that air bubbles are formed in the piping. These air bubbles obstruct the smooth flowing of liquid, thereby causing the formation of turbulence.

In order to overcome the above-described drawbacks, forging is adopted make ball valves. Referring to FIG. 3, a steel material is heated at high temperature and forged directly into a solid spherical semi-finished product. After surface processing, a ball valve structure 3 is accomplished.

However, although making ball valves using forging can eliminate the disadvantages of the cast ball valves, there are other problems to be solved.

Since a solid ball valve is heavy, when the ball valve urges against the water stopping washers 51 of the water valve 5 and rotates, the weight of the ball valve on the water stopping washers (since both side portions of the ball valve are inserted into the water stopping washers) will cause the water stopping washers to deform in shape after a period of time, and they will also become vulnerable to wear during rotation of the ball valve. As a result of deformation and wear, the ball valve can no longer be in tight fit with the water stopping washers on both sides, and clearances are formed. Therefore, even when the ball valve closes, there is leakage in the piping. And when a technician come to maintain the piping by employing welding, explosion may easily occur.

SUMMARY OF THE INVENTION

A primary object of the present invention is to provide a method of making a ball valve that has reduced weight. According to the method of the present invention, two ball valve halves are hot forged into shape and friction welded together to form a ball valve having a hollow interior defining a straight flow channel, so that the weight of the ball valve borne by water stopping washers on both sides thereof, so as to reduce the force of rotation of the ball valve to reduce the load of the water stopping washers, thereby prolonging the service life of the ball valve.

Another object of the present invention is to provide a method of making a ball valve having a straight flow channel to allow smooth flow of water, in which two ball valve halves are forged into shape and are coupled together to form a ball valve using friction welding such that a straight flow channel is defined in the center of the ball valve to allow smooth flow of water and avoid formation of turbulence.

A further object of the present invention is to provide a method of making a ball valve in a quick manner, in which the ball valve along with a straight flow channel thereof is formed by forging and friction welding, without the need to bore an internal flow hole using a lathe as in the prior art, thus speeding up the production rate.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
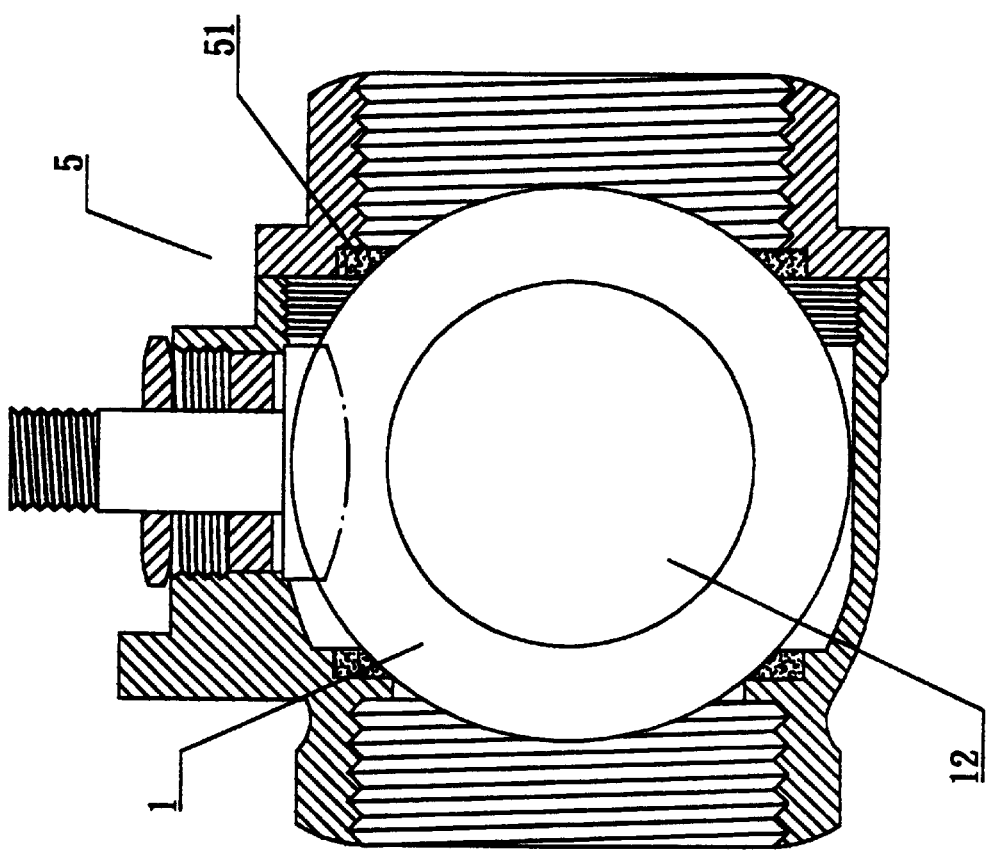
FIG. 1 illustrates the relationship between an ordinary water valve and a ball valve.
Figure 3:
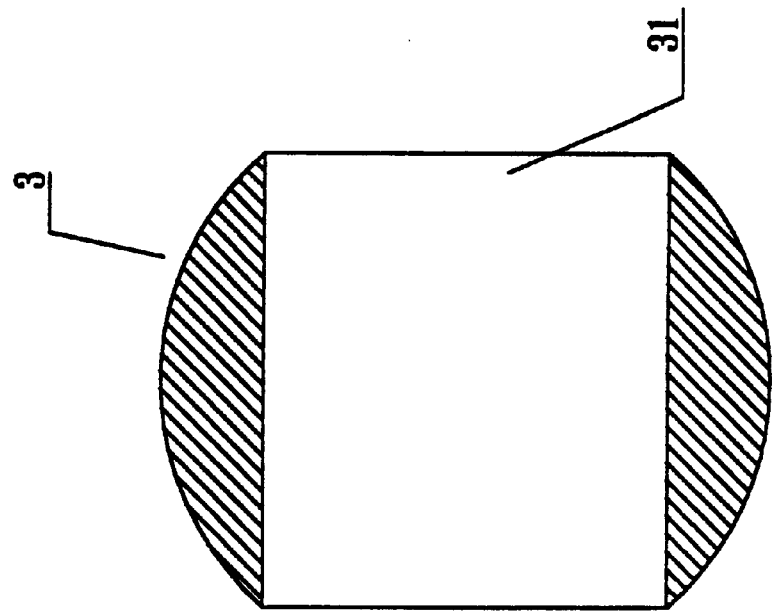
FIG. 3 is a plan sectional view of the conventional forged ball valve.
Figure 2:
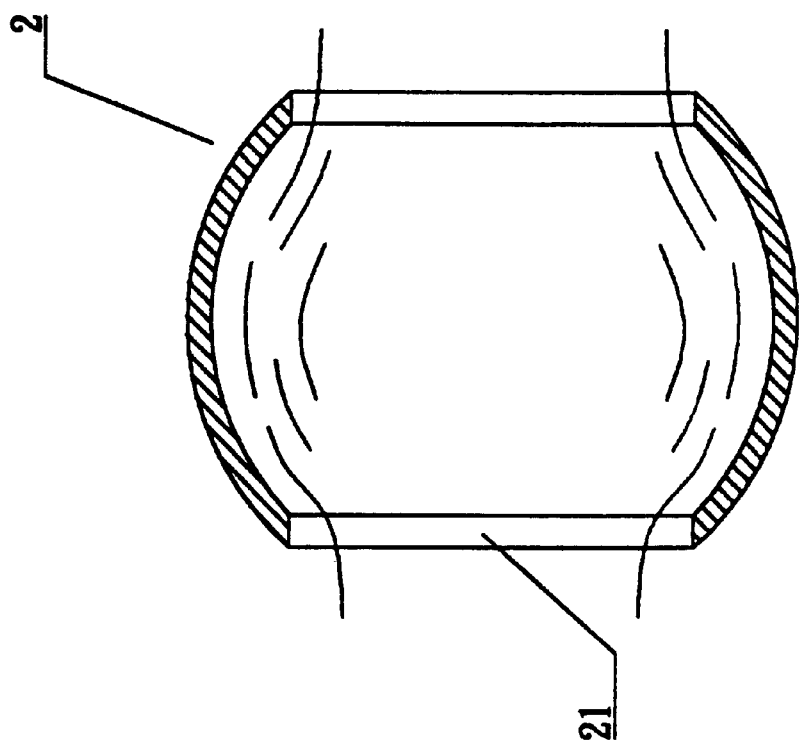
FIG. 2 is a plan sectional view of the conventional cast ball valve.
Figure 4:
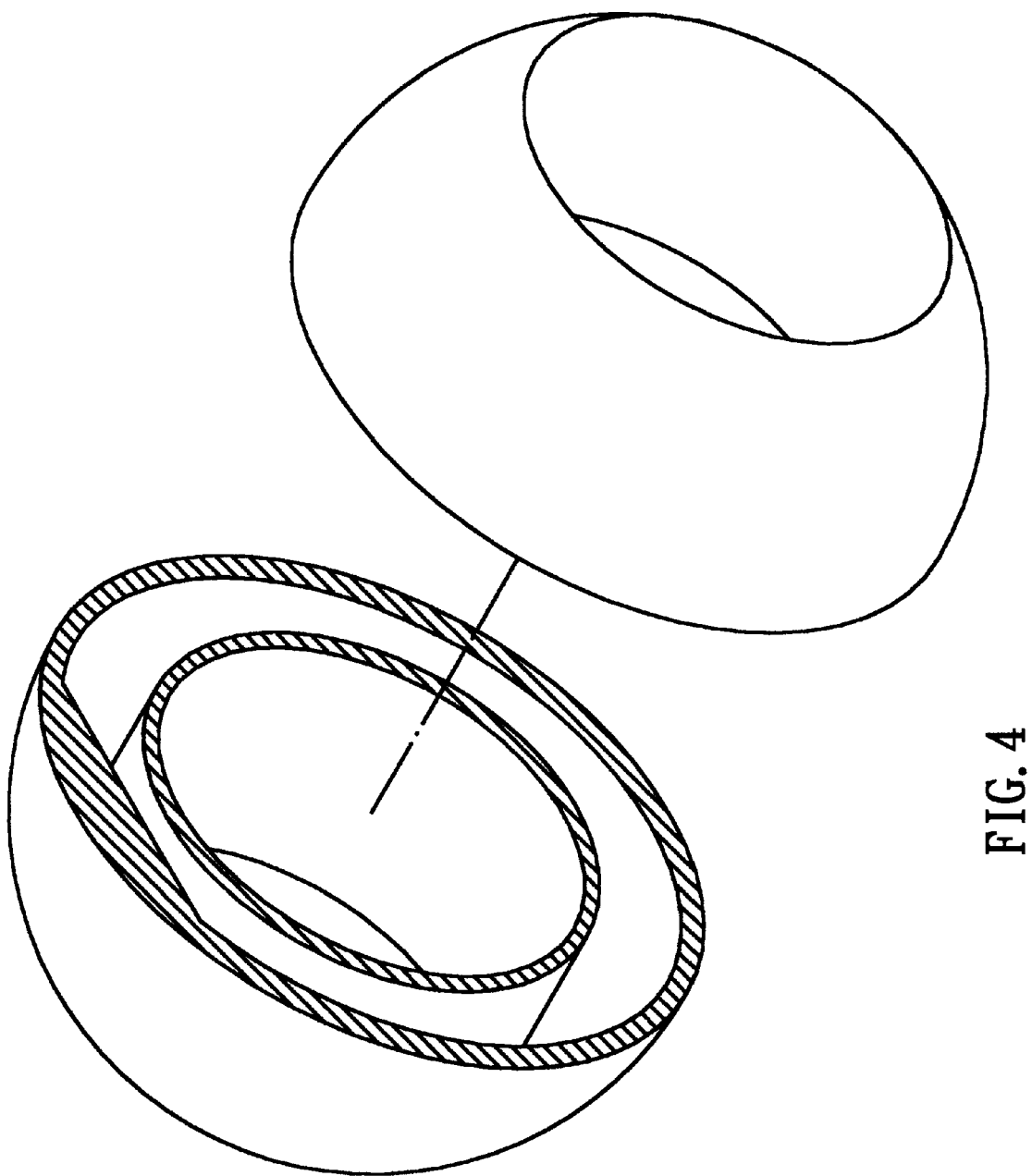
FIG. 4 is a perspective exploded view of the ball valve of the present invention.
Figure 5:
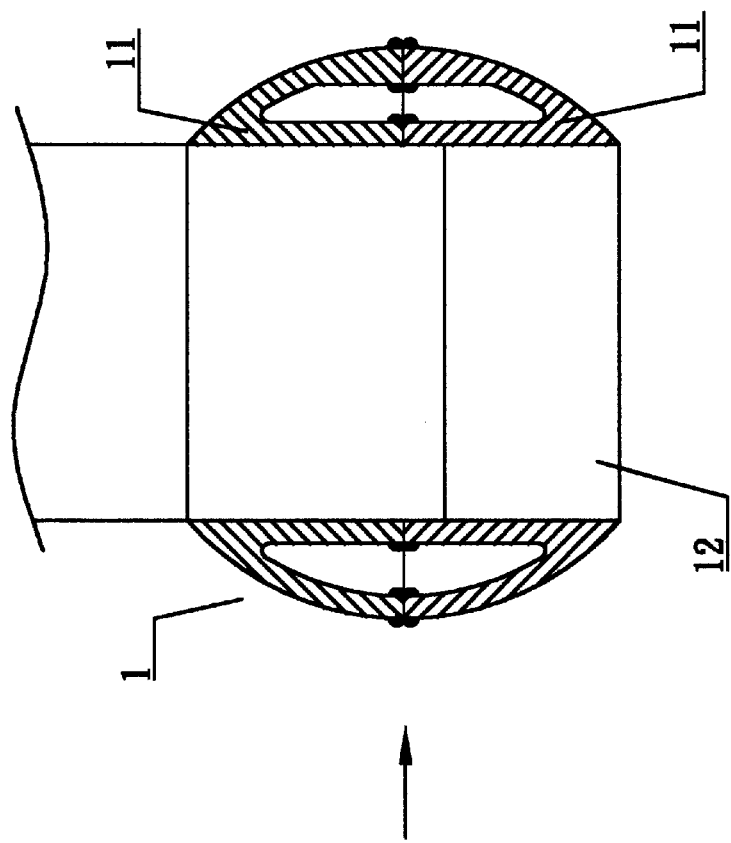
FIG. 5 is a plan sectional view of the ball valve of the present invention.
Figure 5:
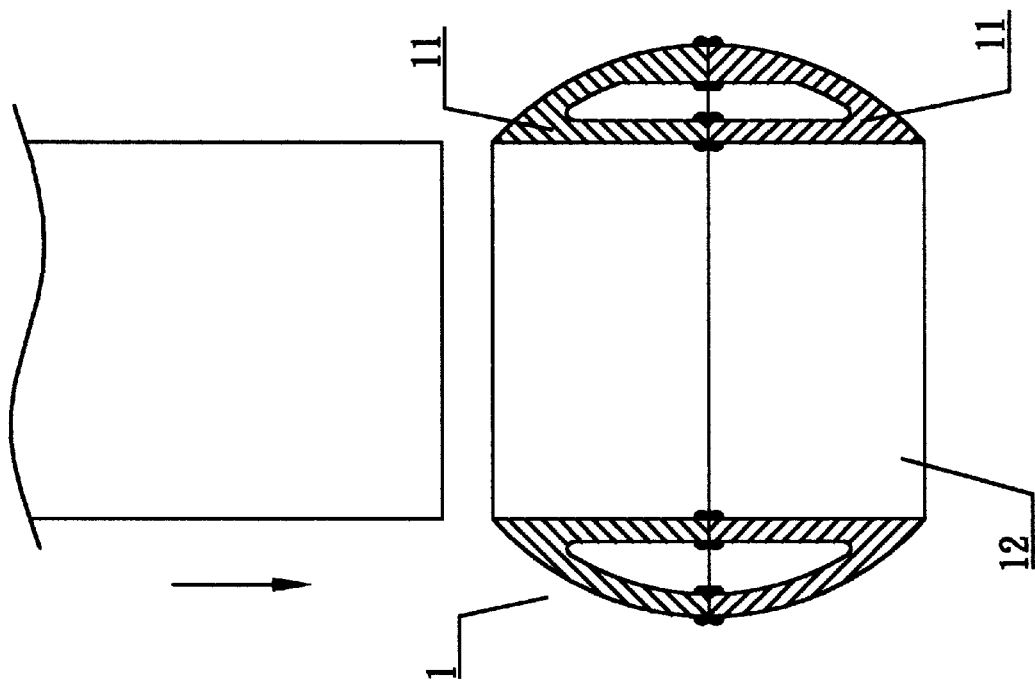

With reference to FIGS. 4 and 5, a method of making ball valves according to the present invention essentially comprises the steps of (A) forging into shape; (B) friction welding, and (C) product processing.

In step (A), two symmetrical ball valve halves 11 are made by forging such that they each have a spherically curved outer wall and a cylindrical inner wall joined at one end to the outer wall and otherwise separated by a channel.

Friction welding refers to the utilization of high-speed rotation to cause contact surfaces of metal to be welded together as a whole. In step (B), the ball valve halves 11 are brought together to form a spherical ball valve 1, and friction welding is employed to cause the ball valve halves 11 to be welded integrally so that a reinforcing rib 13 is formed at the welding surfaces due to fusion.

In step (C), a punch having a ram of a diameter corresponding to that of a straight flow channel 12 of the ball valve 1 is used to remove the rib 13 on the inner wall of the straight flow channel 12 in the center of the ball valve 1 so that the wall surface of the straight flow channel 12 is smooth. A lathe tool is then used to process the surface of the ball valve 1.

By means of the above-mentioned steps of the present invention, a hollow ball valve with a reduced weight is accomplished. As the straight flow channel 12 is located at the center of the ball valve 1, the weight borne by the water stopping washers 51 on both sides of the ball valve 1 can be reduced; the force of rotating the ball valve 1 can be decreased, and the load of the water stopping washers 51 can also be alleviated to thereby prolong the service life thereof. Besides, the straight flow channel 12 ensures the smooth flow of water therethrough.

Advantages of the present invention are set forth below:

1. Reduced Weight:

The ball valve of the present invention is formed by utilizing forging and friction welding so that it has a hollow interior with a straight flow channel at the center thereof. Due to such a construction, the weight of the ball valve borne by the water stopping washers on both sides thereof can be reduced; the force of rotating the ball valve can be decreased; and the load of the water stopping washers can also be alleviated, thereby prolonging the service life of the ball valve.

2. Smooth Water Flow:

After formation, the ball valve will have a straight flow channel at the center to allow smooth flow of water therethrough, without causing any turbulence.

3. Speedy Production:

As the ball valve of the present invention along with the straight flow channel thereof is formed by forging and friction welding, there is no need to bore an internal flow hole using a drill as in the prior art. Hence, the production speed can be increased.

Although the present invention has been illustrated and described with reference to the preferred embodiment thereof, it should be understood that it is in no way limited to the details of such embodiment but is capable of numerous modifications within the scope of the appended claims.

What is claimed is:

1. A method of making ball valves, comprising the steps of:
   a. forging two symmetrical ball valve halves into shape such that they each have spherically curved outer wall and a cylindrical inner wall joined at one end to the outer wall and otherwise separated by a channel;
   b. bringing said ball valve halves together to form a spherical ball valve, and friction welding said ball valve halves as a whole so that reinforcing ribs are formed on the welding surfaces due to fusion, and a straight flow path is defined in said ball valve; and
   c. using a punch with a ram having a diameter corresponding to that of said straight flow path of said ball valve to remove the reinforcing rib on the inner wall of said straight flow path so that the wall surface of said straight flow path is smooth; and processing the surface of said ball valve, whereby
      a weight-reduced hollow ball valve having a straight flow channel in the center thereof is accomplished to allow smooth flow of water therethrough, and reduction in the weight of the ball valve borne by water stopping washers on both sides of the ball valve to thereby prolong the service life of the water stopping washers.

* * * * *